Aug. 19, 1969
T. E. SMITH ET AL
3,462,170
CAMPER STEP CONSTRUCTION
Filed May 2, 1967
2 Sheets-Sheet 1
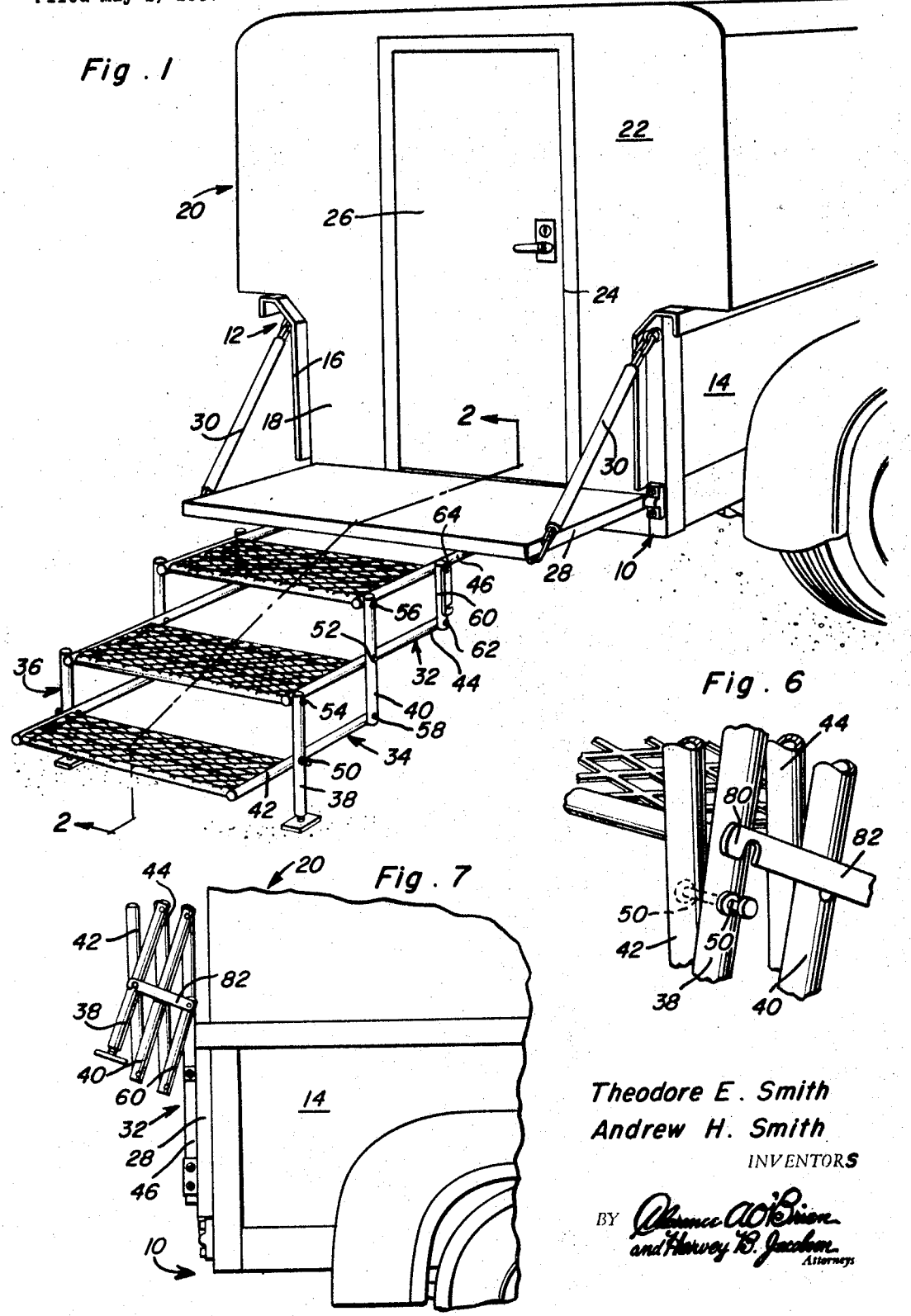
Theodore E. Smith
Andrew H. Smith
INVENTORS
BY *Clarence A.O'Brien*
*and Harvey B. Jacobson*
Attorneys

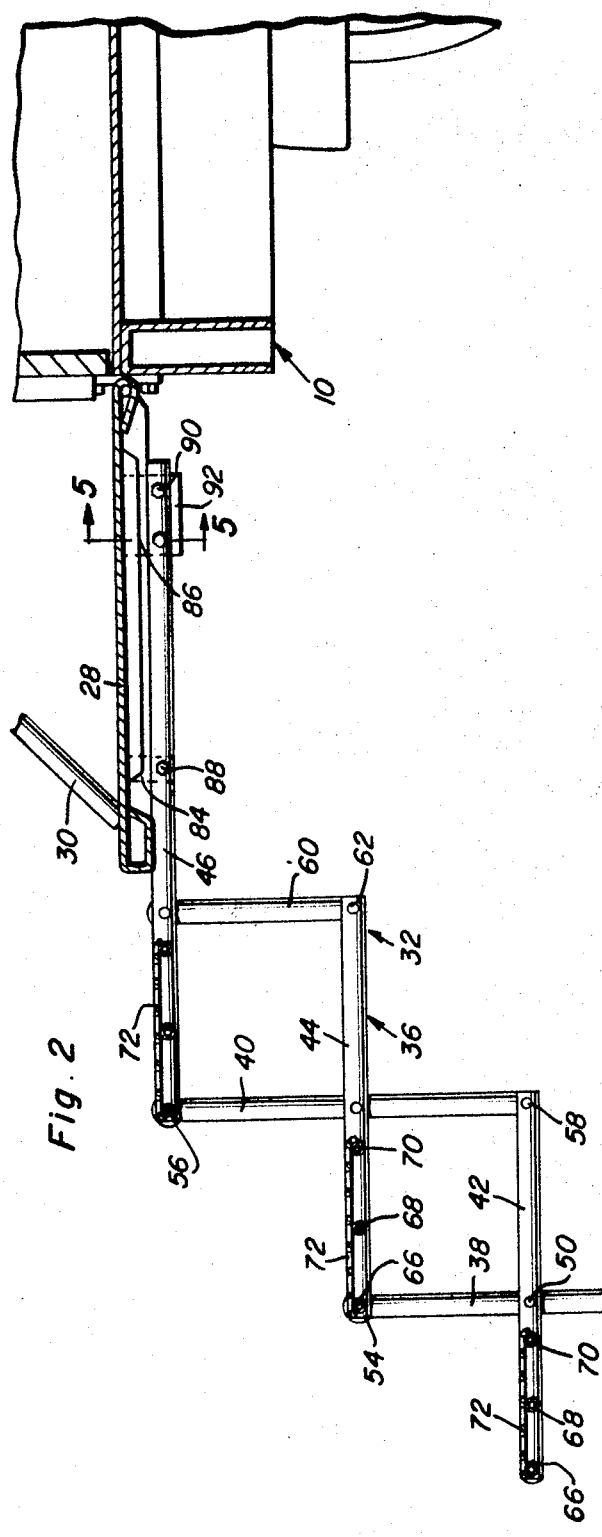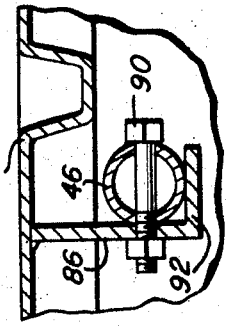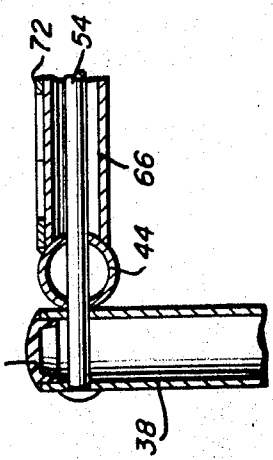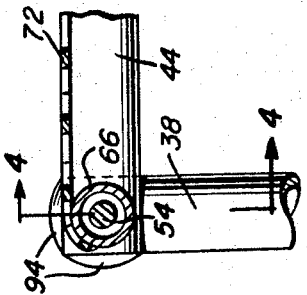

United States Patent Office 3,462,170
Patented Aug. 19, 1969

1

3,462,170
CAMPER STEP CONSTRUCTION
Theodore E. Smith, 5341 Hackberry Lane, Sacramento, Calif. 95841, and Andrew H. Smith, 8619 Stehlin Ave., Orangevale, Calif. 95662
Filed May 2, 1967, Ser. No. 635,527
Int. Cl. B60r 3/02; B60p 3/32; E06c 5/26
U.S. Cl. 280—166                               5 Claims

ABSTRACT OF THE DISCLOSURE

A collapsible step construction defining an upper forward end and a lower rear end and consisting of a pair of opposite side frames including elongated upstanding riser members and elongated horizontal tread members, the horizontal tread members disposed below the uppermost tread member and the corresponding riser members of said frames being crossed and pivotally secured together intermediate their opposite ends and the upper ends of the riser members of each frame being pivotally secured to the adjacent rear ends of the tread members disposed immediately thereabove while the lower ends of the riser members are pivotally secured to the adjacent forward ends of the tread members immediately therebelow.

---

The step construction has been specifically designed to be utilized in conjunction with the swingable tailgate of a pickup truck having a camper body mounted thereon and is to be secured to the tailgate in a manner such that the step construction may be collapsed before the tailgate is closed with the step construction projecting only slightly rearwardly of the tailgate when closed as well as extended to the step-defining position after the tailgate is opened and with the open horizontally disposed tailgate defining an extension of the upper tread of the step construction.

The step construction includes only two dependingly supported feet at its rear lower end when the step construction is extended, the feet being independently vertically adjustable relative to the remainder of the step construction whereby irregularities in the surface of the ground on which the associated pickup truck is disposed may be readily compensated for.

The main object of this invention is to provide a collapsible step construction for the rear portion of a pickup truck having a camper body supported therefrom.

Another object of this invention, in accordance with the immediately preceding object, is to provide a step construction adapted to be supported from the tailgate of the associated pickup truck in a manner such that the tailgate, when in an open horizontally disposed position, defines a portion of the uppermost riser of the step construction.

Still another object of this invention is to provide a collapsible step construtcion for support from the tailgate of a pickup truck and which is mounted on the tailgate in a manner such that the step construction, when collapsed, will not project excessively rearwardly of the tailgate when the latter is in its upstanding closed position.

A final object of this invention to be specifically enumerated herein is to provide a collapsible step construction in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the rear end of a pickup truck upon which a camper body is disposed and with the tailgate of the pickup truck positioned in a horizontal open position and with the step construction supported from the tailgate and in an extended position;

FIGURE 2 is an enlarged fragmentary longitudinal vertical sectional view taken substantially upon the plane indicated by the section line 2—2 of FIGURE 1;

FIGURE 3 is an enlarged fragmentary longitudinal vertical sectional view illustrating the pivotal connection between the upper end of one of the riser members of the step construction and the adjacent rear end of the tread member disposed thereabove;

FIGURE 4 is a fragmentary sectional view taken substantially upon the plane indicated by the section line 4—4 of FIGURE 3.

FIGURE 5 is a fragmentary enlarged sectional view taken substantially upon the plane indicated by the section line 5—5 of FIGURE 2;

FIGURE 6 is a fragmentary perspective view illustrating the manner in which the step construction may be locked in the collapsed position; and FIGURE 7 is a fragmentary side elevational view of the rear end of the assemblage illustrated in FIGURE 1 with the tailgate in an upstanding closed position and the step construction locked in a collapsed position.

Referring now more specifically to the drawings the numeral 10 generally designates a pickup truck including a load bed referred to in general by the reference numeral 12 provided with upstanding sides 14 and 16 between which the transversely narrowed lower portion 18 of a camper body or enclosure generally referred to by the reference numeral 20 is received. The camper body 20 includes a rear wall 22 in which a door opening 24 is formed and a swingable door 26 is provided to removably close the door opening 24.

The load bed 12 includes a tailgate 28 pivotally supported at one edge portion to the rear end of the load bed 12 adjacent the lower edges of the side walls or sides 14 and 16 and the tailgate 28 is swingable from an open position such as that illustarted in FIGURE 1 supported at its free edge portion by the inclined flexible tension members 30 and a closed upstanding position such as that illustrated in FIGURE 7.

The step construction is generally referred to by the reference numeral 32 and includes a pair of substantially identical opposite side frames referred to in general by the reference numerals 34 and 36. The frames 34 and 36 are substantially identical in construction and accordingly, only the specific structural features of the frame 34 will be described hereinafter.

The frame 34 includes a plurality of parallel elongated upstanding riser members 38 and 40 and a plurality of elongated generally horizontal tread members 42, 44 and 46. The tread members 42 and 44 are crossed with the riser members 38 and 40, respectively, and pivotally secured thereto as by pivot fasteners 50 and 52. Further, the upper ends of the riser members 38 and 40 are pivotally secured to the rear ends of the tread members 44 and 46, respectively, by means of pivot fasteners 54 and 56, respectively, and the lower end of the riser member 40 is pivotally secured to the forward end of the tread member 42 by means of a pivot fastener 58.

An upstanding link 60 has its lower end pivotally secured to the forward end of the tread member 44 by means of a pivot fastener 62 and its upper end pivotally secured to the portion of the riser member 46 disposed immediately thereabove by means of a pivot fastener 64. Of course, the tread members 42, 44 and 46 parallel each other and the riser members 38 and 40 as well as the link 60 parallel each other. Further, the rear ends of the tread members 42, 44 and 46 projecting rearwardly of the riser members 38, 40 and the link 60, respectively, each has a plurality of elongated brace members 66, 68 and 70 secured thereto at corresponding ends, the remote ends of each set of brace members 66, 68 and 70 being secured to the corresponding rear end of the same tread member of the frame 36. Accordingly, the brace members 66, 68 and 70 interconnect the frames 34 and 36.

A plurality of panel-like tread means defined by sheets 72 of expanded metal overlie and are secured to the sets of brace members 66, 68 and 70. In addition, the opposite side edge portions of each of the sheets 72 are secured to the rear end portions of the corresponding tread members.

The fasteners 54 and 56 extend through the corresponding tubular brace members 66 and the lower ends of the riser members 38 include vertically adjustable screw-type foot members 76. Further, the fasteners 50 include remote outwardly projecting headed end portions 50', see FIGURE 6, with which the notched ends 80 of a pair of locking links 82 may be engaged. The locking links have their ends remote from the notched ends 80 thereof pivotally supported from the fasteners 64.

The forward ends of the tread members 46 are secured to pairs of apertured mounting lugs 84 and 86 projecting rearwardly of the rear face of the tailgate 28 on opposite side portions thereof by means of suitable fasteners 88 and 90, respectively. The forward ends of the tread members 46 generally parallel the medial plane of the tailgate 28 and it is to be noted that the step construction 32 is to be semi-permanently secured to the tailgate 28 by means of the fasteners 88 and 90. The apertured mounting lugs 86 include inturned flange portions 92 which underlie the forward terminal end portions of the tread members 46 when the latter are horizontally disposed and the upper ends of the riser members 38 and 40 as well as the link 60 and the rear ends of the tread members 42, 44 and 46 are provided with resilient caps 94.

From FIGURE 1 of the drawings it will be noted that the horizontally disposed tailgate 28 forms an enlarged portion of the top tread-defining portion of the step construction 32 and that the tailgate 28 may be considered to define a landing of enlarged plan area generally horizontally aligned with the uppermost tread portion defined by the step construction 32. The independently vertically adjustable foot members 76 are provided so as to enable the step construction 32 to compensate for irregularities of the ground surface on which the pickup truck 10 is disposed and the foot members 76 comprise the only points of contact of the step construction 32 with the ground.

From FIGURES 6 and 7 of the drawings it may be seen that the tailgate 28 may be swung to and secured in the closed position and that the step construction 32 may then be collapsed and locked in the collapsed position by means of the locking links 82.

Although various types of structural members may be utilized for forming the tread members, the riser members, the links 60 and the brace members 66, 68 and 70, it is to be noted that lightweight tubular members such as sections of aluminum may be used to advantage. By constructing the step construction 32 of lightweight tubular members, the total weight of the step construction 32 is maintained at a minimum and the weather resistant properties of aluminum tubing also makes the use of aluminum tubing in constructing the step construction 32 desirable.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a vehicle load bed of the type including a tailgate swingable between an upwardly directed upstanding closed position and a lowered rearwardly projecting horizontal position, an enclosure body supported on said load bed and including a rear wall behind which said tailgate is upwardly swingable toward said upstanding position, said rear wall having a door opening formed therein, a collapsible step construction supported from said tailgate and movable between extended and collapsed positions, said step construction, when extended and when said tailgate is in said horizontal position forming steps extending downwardly and rearwardly from the rear marginal edge of said tailgate and including ground engaging means carried by its rear lower end portion positioned for engagement with and support from the ground, said step construction including a pair of opposite side frames, each frame including a plurality of parallel elongated upstanding riser members and a plurality of elongated parallel generally horizontal tread members, the horizontal tread members disposed below the uppermost tread member and the corresponding riser members of each frame being crossed and pivotally secured together intermediate their upper ends, the opposite ends of the riser members being pivotally secured to the adjacent rear ends of the tread members immediately thereabove and the lower ends of said riser members being pivotally secured to the adjacent forward ends of the tread members immediately therebelow, said frames being disposed in laterally spaced relation, a plurality of horizontal tread defining means secured between the rear ends of corresponding tread members of said frames, the forward ends of the uppermost tread members including means securing the uppermost tread members to said tailgate, and the lower end portions of the lowermost risers including downwardly projecting extension comprising said ground engaging means.

2. The combination of claim 1 including means carried by one of the top tread members and releasably connectible with the corresponding lowermost riser for retaining said step construction in a collapsed condition.

3. The combination of claim 1 wherein the lower ends of the riser members crossed with the lowermost tread members include vertically adjustable foot means.

4. The combination of claim 3 wherein said foot means are independently vertically adjustable and comprise the lowest extremities of said step construction so as to thereby comprise the only portions of said step construction adapted for support from the ground.

5. The combination of claim 1 wherein said step construction when extended, includes an uppermost tread portion generally coplanar with said tailgate and disposed rearwardly of the rear marginal edge of said tailgate when the latter is horizontally disposed.

References Cited

UNITED STATES PATENTS

| 196,679 | 10/1877 | Lane | 182—157 |
| 2,575,615 | 11/1951 | Crump | 280—166 |
| 2,858,056 | 10/1958 | Ownby | 182—95 |
| 2,991,118 | 7/1961 | Sleger | 280—166 |
| 3,394,947 | 7/1968 | Stube | 280—166 |

FOREIGN PATENTS 256,149  3/1962  Australia.

BENJAMIN HERSH, Primary Examiner
ROBERT R. SONG, Assistant Examiner

U.S. Cl. X.R.

182—157